United States Patent [19]
Cordier

[11] Patent Number: 5,545,239
[45] Date of Patent: Aug. 13, 1996

[54] PAINTING INSTALLATION

[75] Inventor: André Cordier, Clamart, France

[73] Assignee: Air Industrie Systems - A.I.S., Courbevoie, France

[21] Appl. No.: 494,169

[22] Filed: Jun. 23, 1995

Related U.S. Application Data

[63] Continuation of Ser. No. 181,034, Jan. 14, 1994, abandoned.

[30] Foreign Application Priority Data

Jan. 18, 1993 [FR] France ................................. 93 00410

[51] Int. Cl.⁶ ........................................................ B01D 47/12
[52] U.S. Cl. ............................... 55/223; 55/228; 55/241; 55/242; 55/276; 55/DIG. 46; 454/54
[58] Field of Search .......................... 55/223, 227, 228, 55/240–242, 276, DIG. 46; 454/50–55, 66, 67

[56] References Cited

U.S. PATENT DOCUMENTS

| | | | |
|---|---|---|---|
| 2,538,450 | 1/1951 | Gardner | 55/276 X |
| 3,138,087 | 6/1964 | Larsson et al. | 55/DIG. 46 |
| 4,045,524 | 8/1977 | Bornett | 261/112 |
| 4,265,642 | 5/1981 | Mir et al. | 55/DIG. 46 |
| 4,299,602 | 11/1981 | Cordier et al. | 55/240 |
| 4,350,506 | 9/1982 | Otto | 55/DIG. 46 |
| 4,440,554 | 4/1984 | Perry | 55/241 |
| 4,515,073 | 5/1985 | Dorsch et al. | 55/223 X |
| 4,582,515 | 4/1986 | Eneroth et al. | 55/276 X |
| 4,608,064 | 8/1986 | Napadow | 55/240 X |
| 4,700,615 | 10/1987 | Napadow | 55/DIG. 46 |
| 4,735,637 | 4/1988 | Patte | 55/DIG. 46 |
| 4,984,595 | 1/1991 | Josefsson | 134/38 |
| 5,153,034 | 10/1992 | Telchuk et al. | 55/241 X |

FOREIGN PATENT DOCUMENTS

| | | |
|---|---|---|
| 3428300 | 2/1986 | Germany . |
| 2120576 | 12/1983 | United Kingdom . |
| 2134406 | 8/1984 | United Kingdom . |
| 2156238 | 10/1985 | United Kingdom . |

*Primary Examiner*—Robert Spitzer
*Attorney, Agent, or Firm*—Sughrue, Mion, Zinn, Macpeak & Seas

[57] ABSTRACT

A painting installation has an enclosure and a perforated floor. Air flows downwards inside the enclosure and is mixed with a liquid. Excess paint is extracted from the resulting mixture of the liquid plus excess paint particles from the air. At the same time, the inside of the enclosure and the perforated floor can be washed with water, which is collected separately from the liquid mixture.

10 Claims, 3 Drawing Sheets

PAINTING INSTALLATION

This is a continuation of application Ser. No. 08/181,034 filed Jan. 14, 1994, now abandoned.

The present invention relates to a painting installation, in particular an installation for painting motor vehicle bodies.

BACKGROUND OF THE INVENTION

Known types of painting installation, e.g. as disclosed in French patent No. 79 12 604, filed May 17, 1979 by Air Industrie, comprise an enclosure inside which a perforated floor is disposed, together with means for causing air to flow downwards inside the enclosure, means such as overflow chutes pouring onto trickle walls, serving to circulate water and mix it with the air that has passed through the enclosure, and a tank for collecting the water.

The air serves to entrain particles of paint that have not been deposited on the objects to be painted, and it is intimately mixed with water in a "washer". The water charged in this way is removed and also entrains any waste that may be produced inside the enclosure, either by operators passing therethrough, or else by periodic operations of cleaning the perforated floor and the various inside walls of the enclosure; the polluted water is generally purified and the residue is disposed of.

OBJECTS AND SUMMARY OF THE INVENTION

An object of the present invention is to recover the unused paint in a state of sufficient cleanliness to enable it to be reused subsequently. Such recovery would give rise to savings of paint. In addition, the volume of waste would then be reduced, which would constitute a major advantage, ecologically speaking.

Another object of the invention is to provide a painting installation inside which noise levels are reduced, thereby ensuring operator comfort.

The prior art may be defined by American patent No. 4,984,595 which describes a painting installation in which cleaning is performed by cleaning the floor with a cleaning liquid after all of the orifices through which the cleaning liquid could escape have been closed. The cleaning operation is static and in order to work it relies on the cleaning liquid remaining in contact with the parts to be cleaned for a certain length of time. During this cleaning stage, painting is stopped. The device described in the American patent cannot recover excess paint. The device of the invention differs from that prior art in that it makes it possible simultaneously to implement both washing means and means for mixing excess paint with air, and it also makes it possible to recover the excess paint.

The invention thus provides a painting installation comprising an enclosure, a perforated floor, and a device for causing air to flow downwards inside the enclosure, including distinct first and second means, the first means enabling the inside of the enclosure and the perforated floor to be washed with water, and the second means enabling a liquid to be intimately mixed with the air charged with excess paint, and enabling the excess paint to be extracted from said mixture, which first and second means are capable of being operated simultaneously.

Advantageously, said first means comprise overflow chutes co-operating with converging trickle walls for the washing water, the trickle walls terminating in a collecting gutter connected to at least one pipe leading to the outside of the enclosure.

In a particular embodiment of the invention, the second means comprise overflow chutes co-operating with trickle walls to cause a liquid to trickle, said walls converging and co-operating with means for intimately mixing said liquid with the air charged with excess paint, said second means comprising a member for separating the paint from the liquid, said mixture being applied to a member for separating the paint from the liquid.

Preferably, the liquid at the outlet from the separator member is returned by means of a pump to the chutes.

According to a characteristic of the invention, an antinoise device is disposed between the trickle plates for the liquid.

In a particular embodiment, the antinoise device is fixed to the underside of one of the washing water trickle walls, which is itself disposed above the trickle Walls for the liquid.

Preferably, the antinoise device is constituted by a plurality of metal strips disposed substantially perpendicularly to the mean flow direction of the air arriving over the liquid trickle plates.

The liquid is adapted to the type of paint used, being demineralized water if the paint is a water-based paint.

The washing water is industrial water.

When the paint is a water-based paint, the means for separating the liquid and the paint is constituted by ultrafiltration means.

BRIEF DESCRIPTION OF THE DRAWINGS

The invention will be better understood on reading the following description of various embodiments of the invention given with reference to the accompanying drawings, in which.

MORE DETAILED DESCRIPTION

Figure 1:
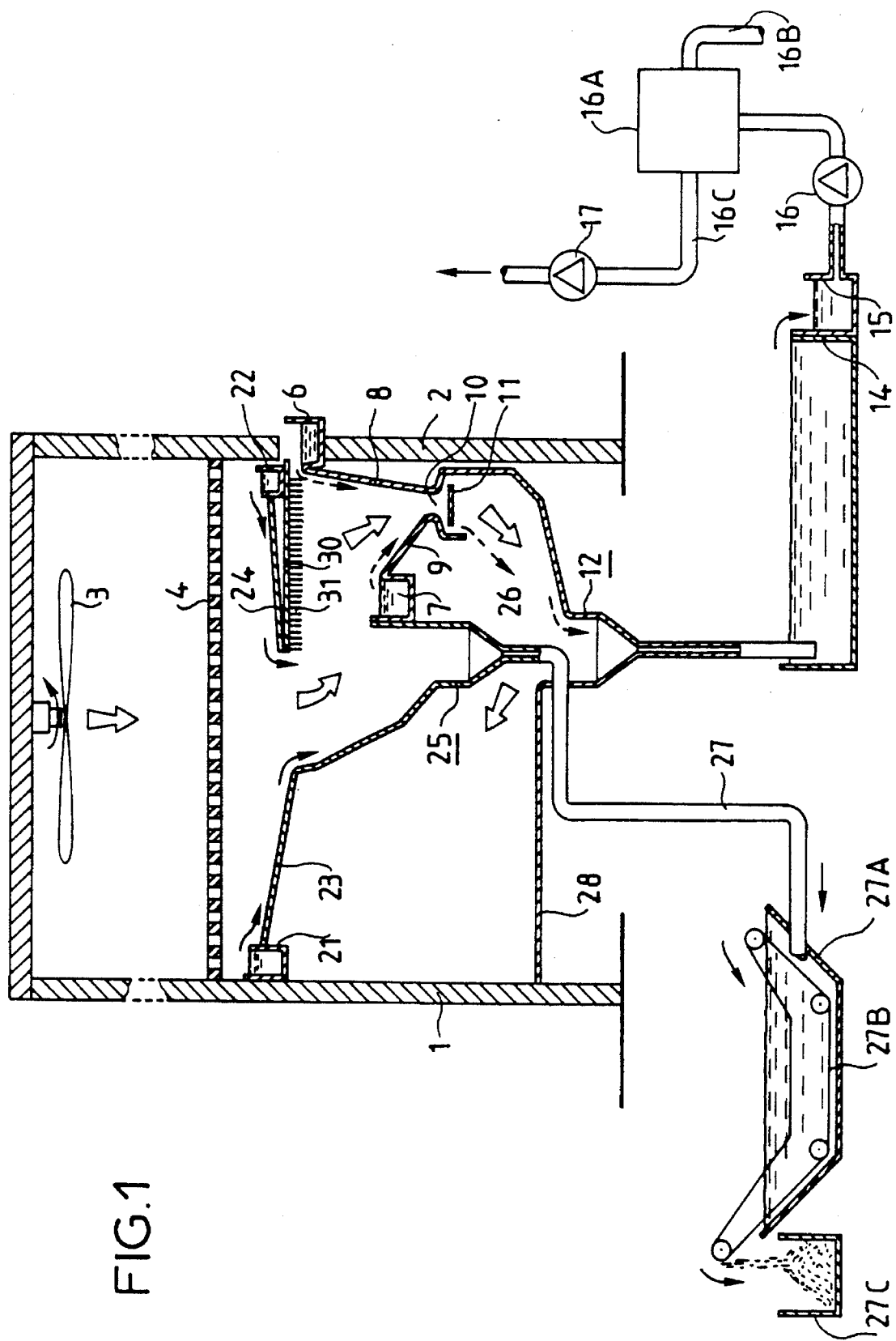
FIG. 1 is a diagrammatic elevation and section view of a painting installation of the invention.

In FIG. 1, references 1 and 2 designate the side walls of an enclosure. Ventilator means 3 are provided at the top of the enclosure and serve to establish a downwards flow of air within the enclosure. In the drawings, air flow is represented by broad open arrows.

The enclosure includes a perforated floor 4 enabling operators to walk about in a manually-operated painting enclosure, and in any event enabling maintenance and cleaning teams to move about.

The members enabling paint operations to be performed (conveyors, paint nozzles, etc. . . . ) do not form part of the invention and are not shown.

The enclosure includes conventional members enabling excess paint to be removed. These members are as follows:

two overflow chutes 6 and 7 conveying a liquid that is adapted to the type of paint used; if the paint is water-based then the liquid is preferably demineralized water. In the figures, liquid flow is represented by arrows with black heads and dashed line shafts;

two converging trickle walls 8 and 9 for defining a bottleneck 10 where air charged with residual paint mixes intimately with the liquid;

a transverse wall 11 for stirring up the air-liquid mixture to clear the air of the paint that it contained. The shape and the disposition of the wall may be as described in French patent No. 73 09 949 filed on Mar. 20, 1973 in the name of Air Industrie; and a collecting basin 12 for the paint-charged liquid.

According to one of the characteristics of the invention, the reception basin is connected to one or more sets of pipework 13 conveying the liquid to a main overflow tank 14. The liquid overflows into a secondary tank 15 from which it is extracted by a pump 16 in order to be applied to a device 16A for separating the liquid from the paint, and adapted to the type of paint used. For water-based paints, the separator device is advantageously an ultrafiltration member. The recovered paint is collected by a pipe 16B. The liquid leaving the filter member via outlet 16C is sufficiently free of paint to be pumped by a pump 17 and recycled to the chutes 6 and 7.

According to another characteristic of the invention, the paint enclosure includes a second set of overflow chutes 21 and 22 that convey washing water which may be ordinary industrial water. The washing water is used to entrain the waste that results from periodic cleaning of the painting enclosure. The path of the washing water is represented by arrows having black heads and continuous line shafts. The washing water trickles over trickle walls 23 and 24 that converge on a collecting gutter 25. The trickle walls 23 and 24 for washing water are disposed above the trickle walls 8 and 9 for demineralized water and they are organized to allow air to pass through them. The washing water is collected from the base of the collecting gutter 25 by means of a funnel 26 and from there it is conveyed by pipework 27 to a settling tank 27A where solid waste can be taken up by a dredge 27B and disposed of at 27C.

It may be observed that the wall 23 co-operates with the wall 1 and with a horizontal wall 28 to define a horizontal duct through which the air is extracted.

Figure 2:
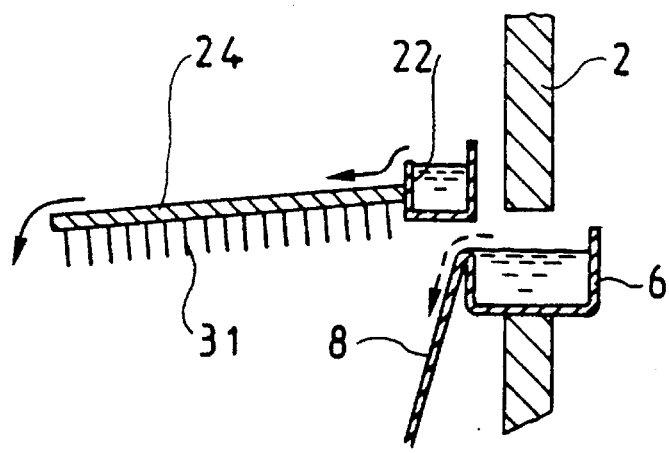
FIG. 2 is a diagrammatic view of a portion of FIG. 1, showing a variant embodiment.

According to another characteristic of the invention, a horizontal wall 30 is disposed above the trickle walls 8 and 9 for demineralized water; this wall 30 carries an antinoise coating 31 that is preferably constituted by a plurality of metal strips disposed perpendicularly to the incident air flow, i.e. practically vertically. In a variant, as shown in FIG. 2, the antinoise coating may be fitted directly to the underside of the trickle plate 24 for washing water, where it overlies the plates 8 and 9.

The antinoise device makes-it possible to reduce the noise level inside the enclosure by at least 3 decibels, with the main source of noise being constituted by the shock of air rushing into the funnel constituted by the trickle plates for demineralized water.

Figure 3:
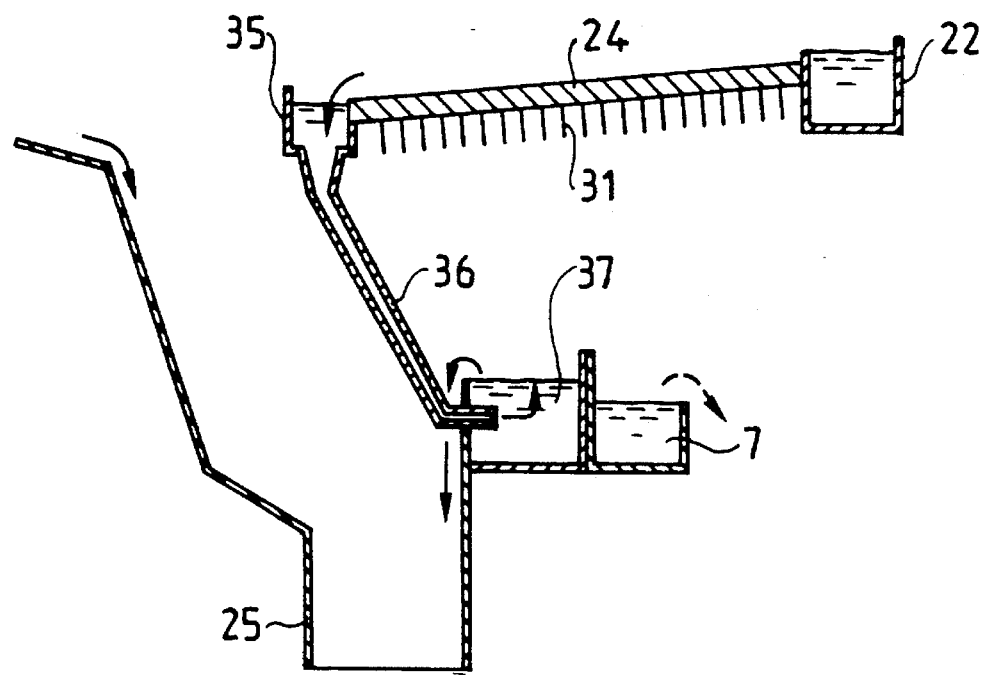
FIG. 3 is a diagrammatic view of a portion of FIG. 1 showing a different variant embodiment.

In the variant shown in FIG. 3, the water trickling down the plate 24 is collected at the end of said plate by means of a chute 35 and is conveyed by pipes 36 into an overflow chute 37 from which it overflows into the gutter 25. This disposition has the advantage of limiting any risk of washing water in the liquid being entrained by the flow of air.

Figure 4:
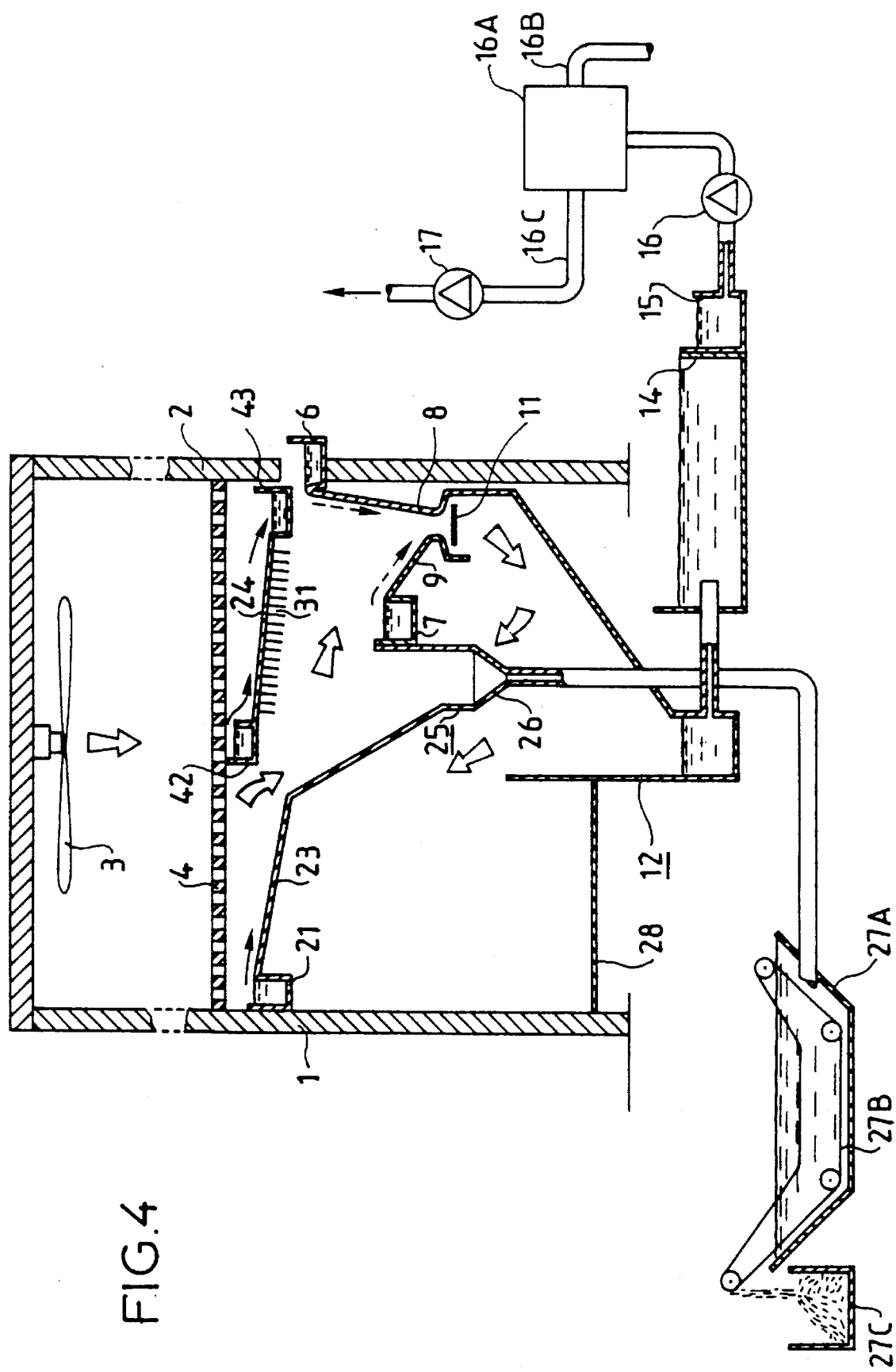
FIG. 4 is a diagrammatic elevation view of another painting installation constituting another embodiment of the invention.

In the variant of FIG. 4, the trickle plate 24 for washing water is at a different slope: its bottom end is adjacent to the wall 2. The washing water is delivered by an overflow chute 42 to the top of the plate 24, and the trickle water is collected in a gutter 43 from which it is conveyed directly to the settling basin 27A by means not shown in the drawing. This disposition is simpler in structure, and serves in particular to reduce the area of the parts that come into contact with the air-paint mixture.

The invention is preferably applied to painting installations in which water-based paint is used, however it also extends to installations using paints based on other solvents.

I claim:

1. A painting installation comprising an enclosure having an inside portion, a perforated floor, a device for causing air flow within the inside portion of the enclosure so that it becomes charged with excess paint and passes downwards inside the enclosure and through the perforated floor, first collecting means and second collecting means disposed below the perforated floor, a source of washing water for providing washing water to at least said perforated floor and means for providing an extracting liquid, said first collecting means being structured with wall surfaces, said wall surfaces providing a first fluid path for washing water from said source of washing water and being operative to collect waste resulting from a cleaning of the inside portion of the enclosure and the perforated floor with washing water and defining a first air path for said air flow, said first collecting means further comprising waste collecting means for collecting a waste water consisting of the washing water with waste therein, and said second collecting means being structured to provide a second fluid path separate and distinct from said first fluid path as well as a second air path connected to said first air path of said first collecting means for a continuation of said air flow, said first and second air paths being operative to collect excess paint suspended in air, said second collecting means comprising:

an opening at the connection of said first and second air paths, said opening being protected against an admission of said waste and washing water, means for catching in said extracting liquid the excess paint suspended in the air, and means for collecting said extracting liquid and the caught excess paint.

2. A painting installation according to claim 1, wherein said first collecting means for collecting the waste water is located under said perforated floor and comprises first overflow chutes co-operating with first converging trickle walls, all of said perforated floor being above at least one of the first overflow chutes and said first converging trickle walls, said first converging trickle walls terminating in a first collecting gutter connected to at least one pipe leading to the outside of the enclosure.

3. A painting installation according to claim 1, wherein:

said second means comprises second converging trickle walls for defining said second air path and for transporting said extraction liquid therealong and being separate from said first converging trickle walls, said means for providing an extracting liquid comprises second overflow chutes provided with said liquid and co-operating with said second converging trickle walls to cause said liquid to trickle along said second air path;

second means for catching in said liquid the excess paint suspended in the air within said second air path comprising means for intimately mixing said liquid with the air and the suspended excess paint and means for separating said air from said liquid with the caught excess paint; and said means for collecting said liquid with the caught excess paint comprising a collecting basin connected to a device for separating the liquid from the caught excess paint.

4. A painting installation according to claim 3, further comprising a pump for returning the said separated liquid to said second overflow chutes.

5. A painting installation according to claim 3, further comprising an anti-noise device disposed above said second trickle walls.

6. A painting installation according to claim 5, wherein at least one of said first trickle walls is disposed above said second trickle walls, said at least one of said first trickle walls having a underside, on which underside is disposed said anti-noise device.

7. A painting installation according to claim 5, wherein said anti-noise device comprises a plurality of metal strips disposed substantially perpendicularly to a mean flow direction of the air and suspended excess paint passing the opening.

8. A painting installation according to claim 3, wherein the device for separating the liquid from the caught excess paint comprises at least ultrafiltration means.

9. A painting installation according to claim 1, wherein the excess paint is a water-based paint, and the extraction liquid is demineralized water.

10. A painting installation according to claim 1, wherein the washing water is industrial water.

* * * * *